(12) United States Patent
Thomas et al.

(10) Patent No.: US 11,572,643 B2
(45) Date of Patent: Feb. 7, 2023

(54) NET

(71) Applicant: THOMAS & FONTAINE LIMITED, Shrewsbury Shropshir (GB)

(72) Inventors: Gerard Thomas, Derby (GB); Dianne Godwin-Thomas, Derby (GB)

(73) Assignee: ARK AGRICULTURE LIMITED, Colchester (GB)

(*) Notice: Subject to any disclaimer, the term of this patent is extended or adjusted under 35 U.S.C. 154(b) by 692 days.

(21) Appl. No.: 16/494,220

(22) PCT Filed: Feb. 22, 2018

(86) PCT No.: PCT/GB2018/050468
§ 371 (c)(1),
(2) Date: Sep. 13, 2019

(87) PCT Pub. No.: WO2018/167457
PCT Pub. Date: Sep. 20, 2018

(65) Prior Publication Data
US 2020/0370214 A1    Nov. 26, 2020

(30) Foreign Application Priority Data

Mar. 15, 2017 (GB) .................................. 1704132
Mar. 16, 2017 (GB) .................................. 1704218

(51) Int. Cl.
*D04B 21/12* (2006.01)
*D03D 1/00* (2006.01)
(Continued)

(52) U.S. Cl.
CPC ............. *D04B 21/12* (2013.01); *A01F 25/13* (2013.01); *D03D 1/00* (2013.01); *D03D 9/00* (2013.01);
(Continued)

(58) Field of Classification Search
None
See application file for complete search history.

(56) References Cited

U.S. PATENT DOCUMENTS 3,109,278 A    11/1963  Gibson, Jr.
2005/0072043 A1*  4/2005  Nieuwoudt ........ A01G 13/0293
                                                    47/31
(Continued)

FOREIGN PATENT DOCUMENTS

DE    202009011658 U    3/1992
GB         2514490 A    11/2014
(Continued)

OTHER PUBLICATIONS

Dairy Consultancy Services, "Secure Covers", retrieved from: https://web.archive.org/web/20131007132413/http://www.dairyconsultancyservice.com/secure-covers.html—http://www.dairyconsultancyservices.com:80/secure-covers.html as archived on Feb. 26, 2016, 8 pages.
(Continued)

*Primary Examiner* — Shawn Mckinnon
(74) *Attorney, Agent, or Firm* — Lee & Hayes, P.C.

(57) ABSTRACT

A wind lift mitigation net for mitigating or preventing wind lift of at least one membrane covering an outdoor aggregation of matter is provided. The wind lift mitigation net comprises a plurality of monofilaments. At least some of the monofilaments may each have a cross-sectional shape that comprises at least one vertex. The cross-sectional shape may, for example, be a non-circular shape such as a tear drop, triangular, square or stellate shape. At least some of the monofilaments may each have at least one substantially planar surface.

17 Claims, 3 Drawing Sheets

(51) Int. Cl.
*A01F 25/13* (2006.01)
*D03D 9/00* (2006.01)
*D03D 15/37* (2021.01)

(52) U.S. Cl.
CPC ....... *D03D 15/37* (2021.01); *D10B 2321/022* (2013.01); *D10B 2321/0211* (2013.01); *D10B 2331/02* (2013.01); *D10B 2331/04* (2013.01); *D10B 2505/204* (2013.01)

(56) References Cited

U.S. PATENT DOCUMENTS

| | | |
|---|---|---|
| 2006/0134389 A1 | 6/2006 | Weiser |
| 2015/0252525 A1 | 9/2015 | Ayers et al. |
| 2016/0353677 A1 | 12/2016 | Toye |

FOREIGN PATENT DOCUMENTS

| | | | |
|---|---|---|---|
| GB | WO2018/167457 A1 | 9/2018 | |
| JP | S61124335 A | 6/1986 | |
| JP | H0465519 A | 3/1992 | |
| JP | H0584025 A | 4/1993 | |
| JP | 2001352844 A | 12/2001 | |
| JP | 2005000005 | 1/2005 | |
| JP | 2005000005 A | 1/2005 | |
| JP | 2005245385 A | 9/2005 | |
| WO | WO2006/127701 A | 11/2006 | |
| WO | WO2006127701 A | 11/2006 | |
| WO | WO2012/077144 A1 | 6/2012 | |
| WO | WO2012077144 A1 | 6/2012 | |
| WO | WO2014178733 A1 | 11/2014 | |
| WO | WO2015122783 A1 | 8/2015 | |

OTHER PUBLICATIONS

The Application for Revocation mailed on May 6, 2021, for Foreign application No. GB256203, Ark Agriculture Limited, 10 pages.
United Kingdom Office Action dated Oct. 7, 2019 for app No. GB1704218.5 Thomas & Fontaine Limited 5 pages.
United Kingdom search report dated Aug. 22, 2018 for app No. GB1704218.5 Thomas & Fontaine 5 pages.
International Search Report for Application No. PCT/GB2018/050468 dated Apr. 30, 2018, 20 pages.
Search Report under Section 17 for Application No. GB1704218.5, dated Aug. 21, 2018, 2 pages.
Secure Covers, "Easy to use alternative to tyres", Secure Covers, Thomas Fontaine, retrieved from: www.securecovers.com , 2 pages.
Secure Covers, "Silage Covers & Windbreakers", Secure Covers, Thomas and Fontain Ltd., Oct. 18, 2016, retrieved from: http://www.securecovers.co.uk/spec.html , retrieved on Feb. 19, 2020, 3 pages.
United Kingdom Office Action dated Mar. 19, 2020 for app No. GB1704218.5 Thomas & Fontaine Limited 5 pages.
United Kingdom Office Action dated Mar. 23, 2021 for app No. GB2102820.4 Ark Agriculture Limited 8 pages.

* cited by examiner

NET

CROSS REFERENCE TO RELATED APPLICATIONS

This application is a 35 U.S.C. 371 National Stage Application of International Application No. PCT/GB2018/050468, filed Feb. 22, 2018, which claims priority to GB1704132.8, filed Mar. 15, 2017, and to GB1704218.5, filed Mar. 16, 2017, the entire contents of which are incorporated herein by reference.

TECHNOLOGICAL FIELD

Embodiment of the present invention relate to a net. In particular, they relate to a net for mitigating or preventing wind lift of at least one membrane covering an outdoor aggregation of matter.

BACKGROUND

Agricultural matter, such as silage for livestock feed, chopped forage or other agricultural products may be aggregated outdoors by ensiling it in pits or stacks on the ground. It may then be compressed and covered with a membrane such as plastic sheeting.

The presence of the plastic sheeting creates an anaerobic environment to allow a lactic acid fermentation which preserves the ensiled matter. It is important for the plastic sheeting to be held in close contact with the ensiled matter during storage to maintain anaerobic conditions. In some circumstances, items such recycled tyres or bags containing sand or gravel are placed on the plastic sheeting to hold it in place.

Use of recycled tyres or bags containing sand or gravel to hold plastic sheeting in place can be inconvenient and unhygienic.

BRIEF SUMMARY

According to various, but not necessarily all, embodiments of the invention there is provided a wind lift mitigation net for mitigating or preventing wind lift of at least one membrane covering an outdoor aggregation of matter, the wind lift mitigation net comprising: a plurality of monofilaments, wherein at least some of the monofilaments each have a cross-sectional shape that comprises at least one vertex.

At least some of the monofilaments may each have a cross-sectional shape comprising a plurality of vertices. At least some of the monofilaments may each have a polygonal cross-sectional shape. For example, at least some of the monofilaments each have a triangular, square, stellate or tear drop cross-sectional shape.

The plurality of monofilaments may be made from at least one plastics material. The plastics material(s) may comprise high-density polyethylene (HDPE), a HDPE/LDEP (low density polyethylene) blend, polypropylene, a polyamide and/or polyester.

At least some of the monofilaments may each have a width dimension of less than 1 millimetre. Preferably, at least some of the monofilaments have a width dimension of 0.6 millimetres or less. More preferably, at least some of the monofilaments have a width dimension of 0.3 millimetres or less.

At least some of the monofilaments may each have a depth dimension of less than 1 millimetre. Preferably, at least some of the monofilaments have a depth dimension of 0.5 millimetres or less. More preferably, at least some of the monofilaments have a depth dimension of 0.3 millimetres or less.

The wind lift mitigation net may have an area density in the range 100 $g/m^2$ to 600 $g/m^2$. Preferably, the wind lift mitigation net may have an area density in the range 200 $g/m^2$ to 400 $g/m^2$. More preferably, the wind lift mitigation net may have an area density in the range 250 $g/m^2$ to 350 $g/m^2$.

The wind lift mitigation net may be a woven or knitted net comprising a plurality of woven or knitted monofilaments. The plurality of monofilaments may be warp knitted, for example, in accordance with a raschel knit pattern or a tricot knit pattern.

According to various, but not necessarily all, embodiments of the invention there is provided a wind lift mitigation net for mitigating or preventing wind lift of at least one membrane covering an outdoor aggregation of matter, the wind lift mitigation net consisting of: a plurality of monofilaments, each monofilament having a cross-sectional shape that comprises at least one vertex.

According to various, but not necessarily all, embodiments of the invention there is provided a wind lift mitigation net for mitigating or preventing wind lift of at least one membrane covering an outdoor aggregation of matter, the wind lift mitigation net comprising: a plurality of monofilaments, wherein at least some of the monofilaments each have at least one substantially planar surface.

According to various, but not necessarily all, embodiments of the invention there is provided a net for mitigating or preventing wind lift of at least one membrane covering an outdoor aggregation of matter, the net comprising: a plurality of monofilaments, wherein at least some of the monofilaments each have a cross-sectional shape that comprises at least one vertex.

According to various, but not necessarily all, embodiments of the invention there is provided a net for mitigating or preventing wind lift of at least one membrane covering an outdoor aggregation of matter, the net comprising: a plurality of monofilaments, wherein at least some of the monofilaments each have at least one substantially planar surface.

According to various, but not necessarily all, embodiments of the invention there is provided a knitted wind lift mitigation net for mitigating or preventing wind lift of at least one membrane covering an outdoor aggregation of matter, the knitted wind lift mitigation net comprising: a plurality of monofilaments made from a plastics material, wherein at least some of the monofilaments each have a polygonal cross-sectional shape; and wherein the wind lift mitigation net has: a bending length of 65-80 mm; a flexural rigidity of 2000-4000 µjoules/m; a mean roughness depth of 1000-2500 µm; a mean peak width of 600-1000 µm; and a void volume of 840-1050 $cm^3/m^2$.

According to various, but not necessarily all, embodiments of the invention there is provided a method, comprising: covering an outdoor aggregation of matter with at least one membrane; at least partially covering the at least one membrane with a wind lift mitigation net comprising a plurality of monofilaments, wherein at least some of the monofilaments each have a cross-sectional shape that comprises at least one vertex.

According to various, but not necessarily all, embodiments of the invention there is provided a method, comprising: covering an outdoor aggregation of matter with at least one membrane; at least partially covering the at least one membrane with a wind lift mitigation net comprising a plurality of monofilaments, wherein at least some of the monofilaments each have at least one substantially planar surface.

The matter may be agricultural matter, landfill items, salt, sand and/or mineral aggregates.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

As described above, one or more membranes may be used to cover matter, such as agricultural matter, in order to create an anaerobic environment for storage. Embodiments of the invention relate to a net that is used to partially or wholly cover the membrane(s), in order to mitigate or prevent wind lift of the membrane(s).

Figure 1:
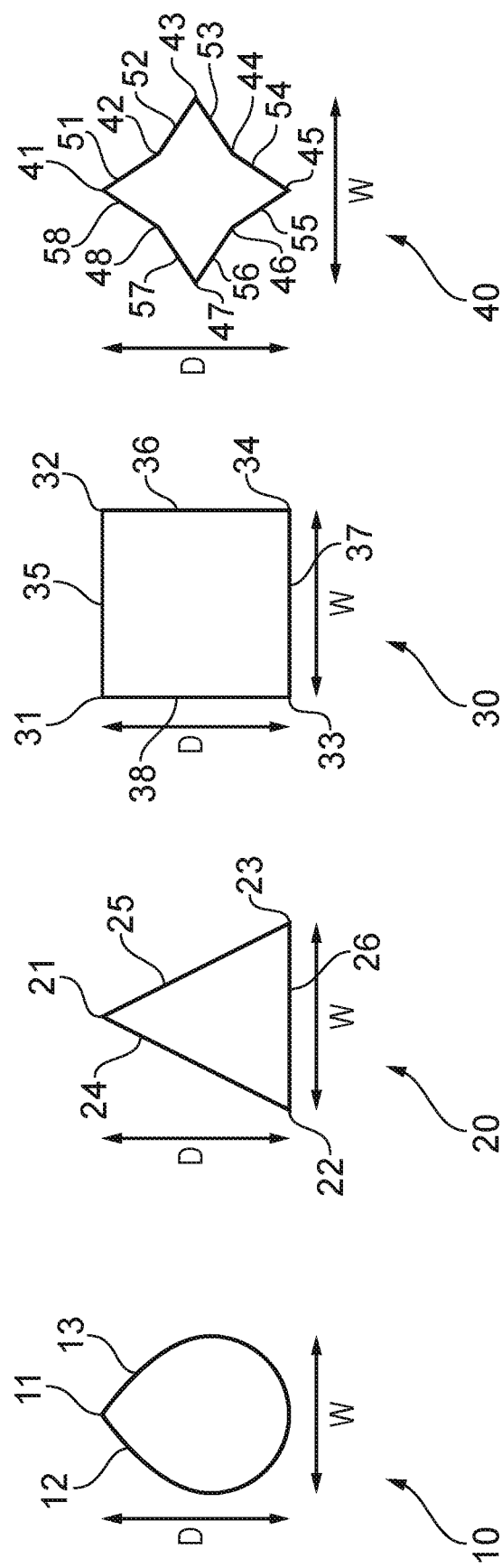
FIG. 1 illustrates monofilaments with tear drop, triangular, square and stellate cross-sections.

FIG. 1 illustrates a first, second, third and fourth monofilaments/yarns 10, 20, 30, 40 with different, non-circular cross-sections. Each of the monofilaments 10, 20, 30, 40 has a cross-sectional shape comprising at least one vertex. Each of the monofilaments 10, 20, 30, 40 has at least one substantially planar surface.

Each of the monofilaments 10, 20, 30, 40 has a length dimension, a width dimension and a depth dimension. The width dimensions are denoted with a W and the depth dimensions are noted with a D in FIG. 1. The length dimensions are not shown in FIG. 1 and extend into and out of the page. In respect of each monofilament 10, 20, 30, 40, the length dimension is perpendicular to the width and depth dimensions. The width dimension is perpendicular to the depth dimension.

The length dimension of the monofilament 10, 20, 30, 40 is much greater than the width and depth dimensions. The length dimension of the monofilament 10, 20, 30, 40 from which a net is formed will depend upon the size of the net to be made. It might, for example, be tens or hundreds of metres long.

The width dimension might, for example, be less than 1 millimetre. Preferably, the width dimension might be 0.6 millimetres or less. More preferably, the width dimension might be 0.3 millimetres or less.

The depth dimension might, for example, be less than 1 millimetre. Preferably, the depth dimension might be 0.6 millimetres or less. More preferably, the depth dimension might be 0.3 millimetres or less.

The monofilaments 10, 20, 30, 40 might be made from at least one plastics material. The plastics material(s) might comprise high-density polyethylene (HDPE), a HDPE/LDEP (low density polyethylene) blend, polypropylene, a polyamide and/or polyester.

The first monofilament 10 has a substantially tear drop cross-sectional shape. The first monofilament 10 comprises a single vertex 11 at the apex of the tear drop shape and comprises two substantially planar surfaces 12, 13.

The second monofilament 20 has a substantially triangular cross-sectional shape. The second monofilament 20 comprises three vertices 21-23 and comprises three substantially planar surfaces 24-26. The triangular cross-sectional shape could be an equilateral triangle, an isosceles triangle or a scalene triangle.

The third monofilament 30 has a substantially square cross-sectional shape. The third monofilament 30 comprises four vertices 31-34 and comprises four substantially planar surfaces 35-38.

The fourth monofilament 40 has a substantially stellate (star-shaped) cross-sectional shape. The fourth monofilament 40 comprises eight vertices 41-48 and comprises eight substantially planar surfaces 51-58.

Each of the second, third and fourth monofilaments 20, 30, 40 has a polygonal cross-sectional shape and comprises a plurality of vertices.

In alternative embodiments, the monofilaments might have a different shape to those illustrated in FIG. 1 and described above. The example, they might have a rectangular cross-section or a rhombus-shaped cross-section.

Figure 2:
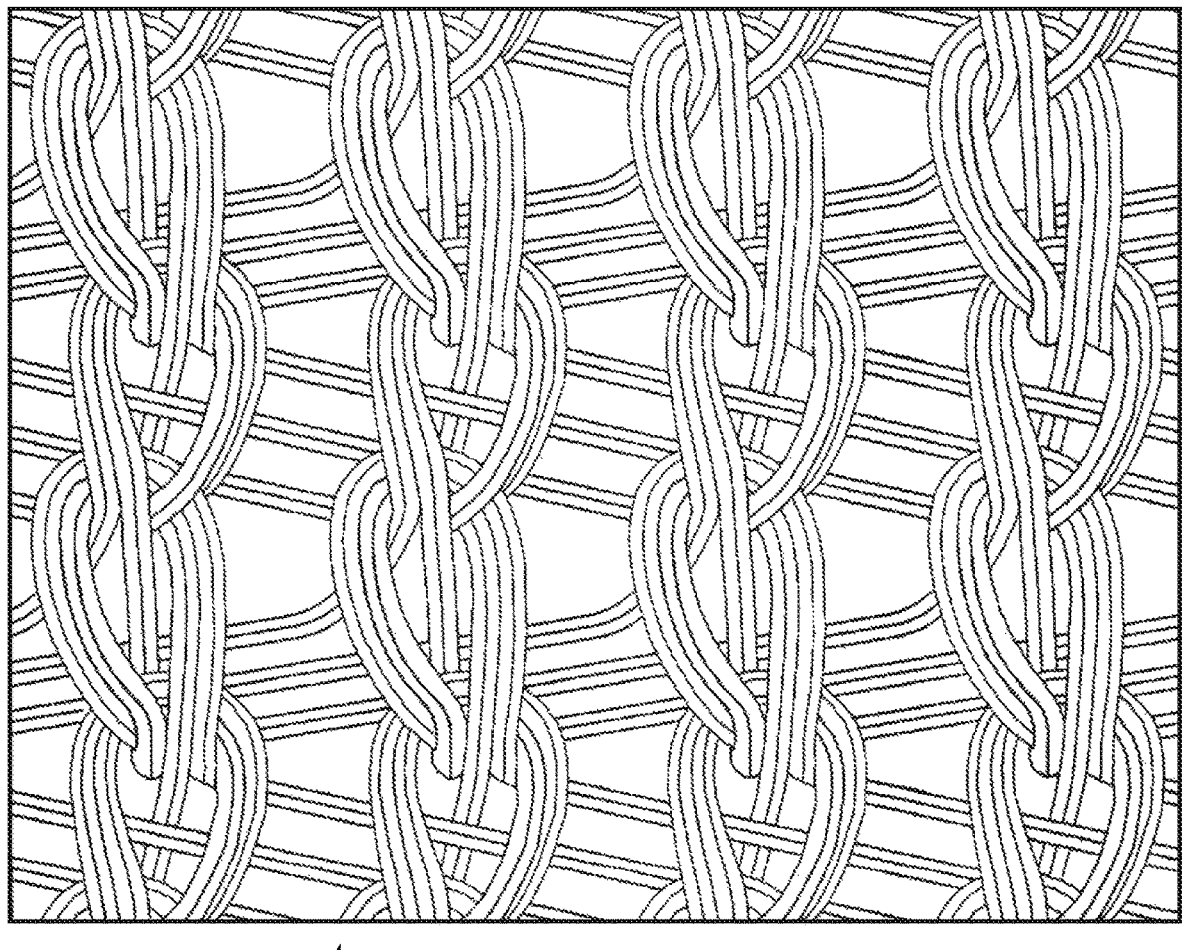
FIG. 2 illustrates a portion of a net comprising a plurality of monofilaments.

FIG. 2 illustrates a portion of a net 100 made from a plurality of monofilaments 10, 20, 30, 40, such as those described above. The net 100 is for mitigating or preventing wind lift of at least one membrane covering an outdoor aggregation of matter, such as agricultural matter, landfill items, salt, sand and/or mineral aggregates.

The net 100 could be a woven net comprising a plurality of woven monofilaments, or a knitted net comprising a plurality of knitted monofilaments. A knitted net might be warp knitted, for example in accordance with a raschel knit pattern or a tricot knit pattern. In the embodiment illustrated in FIG. 2, the net 100 has been knitted in accordance with a tricot knit pattern.

The width and length of the net 100 will depend upon the specific application. The thickness of the net 100 depends upon the width and depth of the monofilaments used to form the net 100 and how the net 100 is constructed. The net 100 might have a thickness in the range 1 millimetre to 1.5 millimetres. Preferably, the thickness of the net 100 is in the range 0.5 millimetres to 2 millimetres. More preferably, the thickness of the net is 1.2 millimetres to 1.4 millimetres. More preferably still, the thickness of the net is in the range 1.25 millimetres to 1.35 millimetres.

Figure 3:
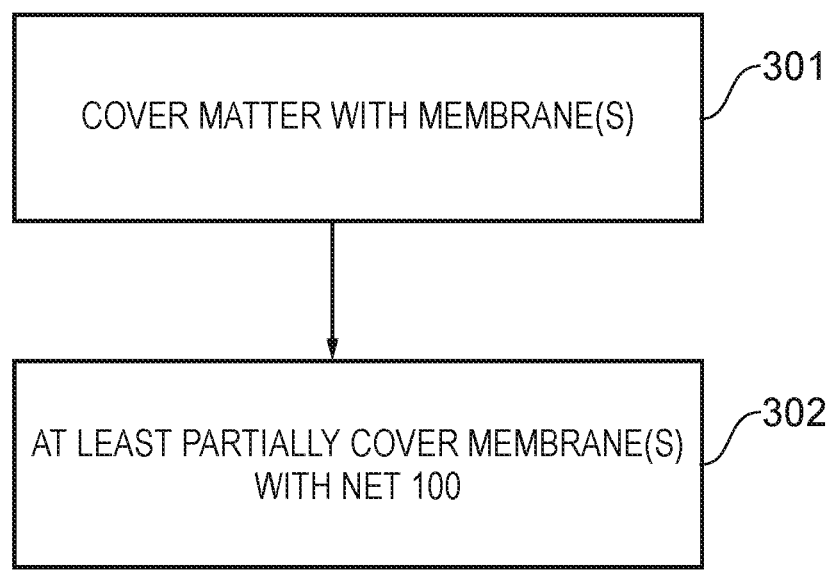
FIG. 3 illustrates a flow chart of a method.

A flow chart of a method is illustrated in FIG. 3. In block 301 in FIG. 3, an outdoor aggregation of matter, such as agricultural matter, is covered with at least one membrane. The membrane(s) might comprise one or more plastic sheets.

In block 302 in FIG. 3, the membrane(s) are covered with a net 100 such as that described above.

The net 100 mitigates or prevents wind lift of the membrane(s). Advantageously, this may help to maintain an anaerobic environment for the matter covered by the membrane(s).

The net 100 functions differently from tyres and bags containing sand or gravel which, as mentioned in the background section, are used in prior art methods of mitigating wind lift of a membrane. While tyres and bags containing sand or gravel merely provide weight to hold portions of the membrane down, the net 100 provides a wind diffusing layer between the wind and the membrane, equalising pressure differences and preventing the membrane from being sucked from the surface of the covered matter.

Woven nets may provide suitable functionality, but knitted nets have been shown to provide better functionality than woven nets in testing. Knitted nets have a more complex three-dimensional structure which causes them to provide a more effective diffusing layer.

Knitted nets are also more flexible than woven nets, enabling them to follow the contours of the membrane(s) more closely. This is also thought to improve performance, keeping the membrane(s) in close contact with the covered matter and preventing aerobic spoilage.

In some embodiments, each and every monofilament in the net 100 will have substantially the same cross-section as the others. For example, the net 100 might consist of tear drop cross-section monofilaments 10, triangular cross-section monofilaments 20, square cross-section monofilaments 30 or stellate cross-section 40 monofilaments. In other embodiments, a single net 100 might include different monofilaments with different cross-sections.

The net 100 might be a knitted net, having an area density of 100 g/m$^2$ to 600 g/m$^2$. Preferably, the area density might be in the range 200 g/m$^2$ to 400 g/m$^2$. More preferably, the area density might be in the range 250 g/m$^2$ to 350 g/m$^2$. Advantageously, the net 100 may be easier to transport than other items that are used to hold a membrane in place, such as tyres or bags containing sand or gravel. For example, the net 100 may be lighter.

The flexural rigidity of a knitted net 100 might be in the region of 500 to 6000 μjoules/m, 2000 to 4000 μjoules/m, 2500 to 4000 μjoules/m or 2900 μjoules/m to 3800 μjoules/m, for example. The bending length of a knitted net 100 might be in the region of 30 millimetres to 140 millimetres, 65 to 80 millimetres, 70 to 80 millimetres or 75 to 80 millimetres. Both the flexural rigidity and the bending length are defined as per ASTM International's D1388-14e1 standard.

A test for determining the bending length and flexural rigidity according to ASTM International's D1388-14e1 standard involves sliding a specimen at a specified rate, along a surface, in a direction parallel to its length dimension until its leading edge projects over an edge of the surface. The length of the overhang is measured when the tip of the specimen is depressed under its own mass to the point where a line joining to the edge of the platform makes a 0.724 rad(41.5° angle) with the horizontal. The bending length and flexural rigidity are determined from the measured length.

The following table provides some example results that were obtained from knitted nets having an area density of 300 g/m$^2$ and comprising monofilaments 10, 20, 30, 40 having the same shapes as those illustrated in FIG. 1.

|  | Woven net (300 g/m$^2$) Circular cross-section | Knitted net (300 g/m$^2$) Circular cross-section | Knitted net (300 g/m$^2$) Tear drop cross-section | Knitted net (300 g/m$^2$) Triangular cross-section | Knitted net (300 g/m$^2$) Square cross-section | Knitted net (300 g/m$^2$) Stellate cross-section |
|---|---|---|---|---|---|---|
| Bending length (mm) | 119.3 | 69.2 | 77.5 | 77.5 | 71.1 | 77.1 |
| Flexural rigidity (μjoules/m) | 7316 | 2509 | 3280 | 3616 | 2965 | 3707 |

It will be appreciated that nets 100 of a different area density from 300 g/m$^2$ will exhibit different flexing properties from those quantified in the table.

The following table indicates results of a stability test that was performed using the nets identified in the above table. The test involved positioning each net on a plastic sheet which in turn covered a smooth convex surface. The net was then exposed to a laminar flow of wind of a speed of 10 m/s and the length of time that each net remained in place was measured.

|  | Woven net (300 g/m$^2$) Circular cross-section | Knitted net (300 g/m$^2$) Circular cross-section | Knitted net (300 g/m$^2$) Tear drop cross-section | Knitted net (300 g/m$^2$) Triangular cross-section | Knitted net (300 g/m$^2$) Square cross-section | Knitted net (300 g/m$^2$) Stellate cross-section |
|---|---|---|---|---|---|---|
| Time (seconds) | 66 | 592 | 778 | 680 | 900* | 842 |

*stopped recording after 900 seconds because the net did not move

It is thought that the diffusing effect provided by the net 100 can be determined by measuring the roughness and the void volume of the net 100.

The mean roughness depth (Rz) of a knitted net 100 might be in the range 1000-2500 μm.

The mean roughness depth (Rz) is the arithmetic mean value of a plurality of Rzi values. Each Rzi value is the sum of the highest peal and the depth of the lowest profile relative to the mean line.

The mean peak width of a knitted net 100 might be in the range 600 to 1000 μm. The mean peak width is the distance between the peaks in the monofilament.

The void volume of a knitted net 100 might be in the range 840 to 1050 cm$^3$/m$^2$. The void volume is the volume of the void within the structure of the net 100, per m$^2$.

In some examples, the net 100 may be a knitted net comprising a plurality of monofilaments 10, 20, 30, 40 with a cross sectional shape such as that illustrated in FIG. 1. That net 100 might have some or all of the following properties:
an area density of 200 g/m² to 400 g/m²;
a flexural rigidity of 2000 to 4000 µjoules/m;
a bending length of 65 to 80 millimetres;
mean roughness depth (Rz) in the range 1000-2500 µm;
a mean peak width in the range 600-1000 µm; and
a void volume of 840 to 1050 cm³/m².

The bending length of that net 100 might instead be 70 to 80 millimetres and the area density might instead be 250 g/m² to 350 g/m².

It will be appreciated that there are other uses for net 100 described above other than the examples described above. For example, the net 100 might be used to mitigate or prevent wind lift of one or more membranes in situations that are different from that described above. For example, the net 100 might have applicability in landfill lining, landfill capping, the covering of salt piles, lagoons or ponds, and/or the covering of an aggregation of matter that is not agricultural matter.

Alternatively, the net 100 might have applicability as a windbreaker, a sunshade and/or a dust suppression layer.

Where a structural feature has been described, it may be replaced by means for performing one or more of the functions of the structural feature whether that function or those functions are explicitly or implicitly described.

Although embodiments of the present invention have been described in the preceding paragraphs with reference to various examples, it should be appreciated that modifications to the examples given can be made without departing from the scope of the invention as claimed. For example, some or all of the monofilaments might have a cross-sectional shape that is different from those described above and illustrated in the figures.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A knitted wind lift mitigation net for mitigating or preventing wind lift of at least one membrane covering an outdoor aggregation of matter, the knitted wind lift mitigation net comprising:
a plurality of monofilaments made from a plastics material, each monofilament having a length dimension, a width dimension and a depth dimension, wherein the length dimension is greater than the width and depth dimensions, wherein each of the width and depth dimensions is less than 1 millimetre, and wherein at least some of the monofilaments each have a cross-sectional shape that comprises at least one vertex; and
wherein the knitted wind lift mitigation net has:
an area density of 250 g/m² to 350 g/m²;
a bending length of 70-80 mm;
a flexural rigidity of 2000-4000pjoules/m;
a mean peak width of 600-1000 µm; and
a void volume of 840-1050 cm³/m².

2. The knitted wind lift mitigation net of claim 1, wherein at least some of the monofilaments each have a cross-sectional shape comprising a plurality of vertices.

3. The knitted wind lift mitigation net of claim 1, wherein at least some of the monofilaments each have a polygonal cross-sectional shape.

4. The knitted wind lift mitigation net of claim 1, wherein at least some of the monofilaments each have a substantially triangular cross-sectional shape.

5. The knitted wind lift mitigation net of claim 1, wherein at least some of the monofilaments each have a substantially square cross-sectional shape.

6. The knitted wind_lift mitigation net of claim 1, wherein at least some of the monofilaments each have a substantially stellate cross-sectional shape.

7. The knitted wind_lift mitigation net of claim 1, wherein at least some of the monofilaments each have a substantially tear drop cross-sectional shape.

8. The knitted wind lift mitigation net of claim 1, wherein at least some of the monofilaments each have a width dimension of 0.6 millimetres or less.

9. The knitted wind lift mitigation net of claim 1, wherein at least some of the monofilaments each have a depth dimension of 0.6 millimetres or less.

10. The knitted wind lift mitigation net of claim 1, wherein the plurality of monofilaments is warp knitted.

11. The knitted wind lift mitigation net of claim 10, wherein the plurality of monofilaments is warp knitted in accordance with a raschel knit pattern or a tricot knit pattern.

12. A knitted wind lift mitigation net for mitigating or preventing wind lift of at least one membrane covering an outdoor aggregation of matter, the knitted wind lift mitigation net comprising:
a plurality of monofilaments made from a plastics material, each monofilament having a length dimension, a width dimension and a depth dimension, wherein the length dimension is greater than the width and depth dimensions, wherein each of the width and depth dimensions is less than 1 millimetre, and wherein at least some of the monofilaments each have at least one substantially planar surface; and
wherein the knitted wind lift mitigation net has:
an area density of 250 g/m² to 350 g/m²;
a bending length of 70-80 mm;
a flexural rigidity of 2000-4000pjoules/m;
a mean peak width of 600-1000 µm; and
a void volume of 840-1050 cm³/m².

13. A method, comprising:
covering an outdoor aggregation of matter with at least one membrane;
at least partially covering the at least one membrane with a wind lift mitigation net comprising a plurality of monofilaments made from a plastics material, each monofilament having a length dimension, a width dimension and a depth dimension, wherein the length dimension is greater than the width and depth dimensions, wherein each of the width and depth dimensions is less than 1 millimetre, wherein at least some of the monofilaments each have a cross-sectional shape that comprises at least one vertex or at least one substantially planar surface; and wherein the wind lift mitigation net has:
an area density of 250 g/m$^2$ to 350 g/m$^2$;
a bending length of 70-80 mm;
a flexural rigidity of 2000-4000pjoules/m;
a mean peak width of 600-1000 μm; and
a void volume of 840-1050 cm$^3$/m$^2$.

14. The method of claim 13, wherein the matter is agricultural matter, landfill items, salt, sand and/or mineral aggregates.

15. The knitted wind lift mitigation net of claim 1, wherein the plastics material comprises high-density polyethylene (HDPE), a HDPE/LDEP (low density polyethylene) blend, polypropylene, a polyamide or polyester.

16. The knitted wind lift mitigation net of claim 1, wherein at least some of the monofilaments each have a width dimension of 0.3 millimetres or less.

17. The knitted wind lift mitigation net of claim 1, wherein at least some of the monofilaments each have a depth dimension of 0.3 millimetres or less.

* * * * *